(12) United States Patent
Hatakeyama et al.

(10) Patent No.: US 9,657,115 B2
(45) Date of Patent: *May 23, 2017

(54) POLYMER COMPOUND FOR A CONDUCTIVE POLYMER AND METHOD FOR MANUFACTURING SAME

(71) Applicant: SHIN-ETSU CHEMICAL CO., LTD., Tokyo (JP)

(72) Inventors: Jun Hatakeyama, Jyoetsu (JP); Koji Hasegawa, Jyoetsu (JP); Takayuki Nagasawa, Jyoetsu (JP); Masayoshi Sagehashi, Jyoetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,167

(22) Filed: Dec. 9, 2014

(65) Prior Publication Data

US 2015/0175722 A1 Jun. 25, 2015

(30) Foreign Application Priority Data

Dec. 20, 2013 (JP) ................. 2013-264247

(51) Int. Cl.
| | | |
|---|---|---|
| C08F 8/00 | (2006.01) | |
| C08F 12/30 | (2006.01) | |
| C08F 112/14 | (2006.01) | |
| C08F 220/38 | (2006.01) | |
| C08F 293/00 | (2006.01) | |
| C08F 12/20 | (2006.01) | |
| H01M 8/1023 | (2016.01) | |
| H01M 8/1039 | (2016.01) | |
| H01B 1/12 | (2006.01) | |

(52) U.S. Cl.
CPC ............ *C08F 8/00* (2013.01); *C08F 12/20* (2013.01); *C08F 12/30* (2013.01); *C08F 112/14* (2013.01); *C08F 220/38* (2013.01); *C08F 293/005* (2013.01); *H01B 1/122* (2013.01); *H01M 8/1023* (2013.01); *H01M 8/1039* (2013.01); *C08F 2438/03* (2013.01); *C08F 2800/10* (2013.01); *Y02P 70/56* (2015.11)

(58) Field of Classification Search
None
See application file for complete search history.

(56) References Cited

U.S. PATENT DOCUMENTS

| | | |
|---|---|---|
| 9,017,924 B2 | 4/2015 | Takaki et al. |
| 2006/0047030 A1 | 3/2006 | Yoshida et al. |
| 2007/0069185 A1 | 3/2007 | Hsu et al. |
| 2008/0102407 A1* | 5/2008 | Ohsawa et al. ............ 430/286.1 |
| 2010/0055608 A1* | 3/2010 | Ohashi ................. C07D 493/18 430/270.1 |
| 2012/0012795 A1 | 1/2012 | Hsu |
| 2012/0082939 A1* | 4/2012 | Kawabata et al. ............ 430/319 |
| 2012/0129103 A1 | 5/2012 | Ohsawa et al. |
| 2012/0202153 A1* | 8/2012 | Hatakeyama ......... G03F 7/0045 430/283.1 |
| 2013/0224659 A1 | 8/2013 | Ohashi et al. |
| 2013/0323647 A1 | 12/2013 | Ohashi et al. |

FOREIGN PATENT DOCUMENTS

| | | |
|---|---|---|
| JP | A-2008-146913 | 6/2008 |
| JP | 2008-546899 A | 12/2008 |
| JP | 2013-228447 A | 11/2013 |
| WO | 2007/002682 A2 | 1/2007 |

OTHER PUBLICATIONS

Mar. 16, 2016 Office Action Issued in U.S. Appl. No. 14/564,494.
Oct. 26, 2015 Search Report issued in European Patent Application No. 15001522.0.
Nov. 23, 2015 Office Action Issued in U.S. Appl. No. 14/564,494.
Aug. 11, 2016 Office Action issued in U.S. Appl. No. 14/717,323.

* cited by examiner

*Primary Examiner* — Robert C Boyle
(74) *Attorney, Agent, or Firm* — Oliff PLC

(57) ABSTRACT

A polymer compound for a conductive polymer including one or more repeating units represented by general formula (1), which has been synthesized by ion-exchange of a lithium salt, sodium salt, potassium salt, or nitrogen compound salt of a sulfonic acid residue, and has a weight average molecular weight in the range of 1,000 to 500,000,

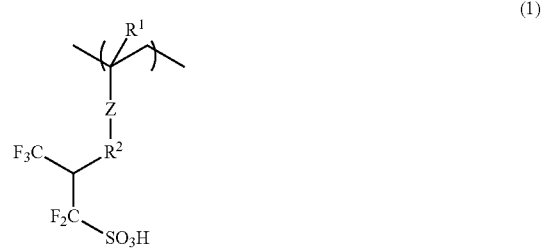

(1)

wherein $R^1$ represents a hydrogen atom or methyl group, $R^2$ represents a single bond, an ester group, or a linear, branched, or cyclic hydrocarbon group having 1 to 12 carbon atoms which may have either or both of an ether group and an ester group, and Z represents a phenylene group, naphthylene group, or ester group. There can be provided a polymer compound for a conductive polymer having a specific super strongly acidic sulfo group, which is soluble in an organic solvent, and suitably used for a fuel cell or dopant for a conductive material.

1 Claim, No Drawings

POLYMER COMPOUND FOR A CONDUCTIVE POLYMER AND METHOD FOR MANUFACTURING SAME

BACKGROUND OF THE INVENTION

Field of the Invention

The present invention relates to a polymer compound for a conductive polymer and a method for manufacturing same.

Description of the Related Art

A polymer containing a sulfo group has been used as a fuel cell or a dopant polymer for a conductive polymer. As a material for a fuel cell, vinyl perfluoroalkyl ether sulfonic acid represented by Registered Trademark of Nafion has widely been used, and as a dopant polymer for a conductive polymer, a polymer of vinyl sulfonic acid or styrene sulfonic acid has widely been used (Patent Document 1).

The vinyl perfluoroalkyl ether sulfonic acid has chemically high stability and excellent durability, but the glass transition point thereof is low, so that there is a problem that when a fuel cell using it is exposed to high temperature, the polymer causes heat flow whereby ion conductivity thereof is lowered. A super strongly acidic polymer having a sulfo group an α-position of which has been fluorinated is effective for heightening ion conductivity, but a material having high glass transition point and chemical stability with high ion conductivity has not yet been found out.

Also, a conductive polymer having a conjugated double bond such as a polythiophene, a polyaniline, a polypyrrole, etc., does not show conductivity itself, but conductivity thereof is expressed by doping therein a strong acid such as sulfonic acid, etc. As the dopant, polystyrene sulfonic acid (PSS) has most frequently been used. This is because conductivity becomes the highest by doping the PSS.

PSS is a water-soluble resin, and is difficultly dissolved in an organic solvent. Accordingly, a polythiophene which uses the PSS as a dopant is also water-soluble.

The polythiophene which uses the PSS as a dopant is highly conductive and highly transparent so that it has been expected to be a conductive film for an organic EL lighting substituting for ITO (indium-tin oxide). However, a luminous body of the organic EL chemically changes by moisture and stops to emit a light. That is, when a conductive film comprising a water-soluble resin is used for an organic EL, there is a problem that an emission lifetime of the organic EL becomes short due to the resin containing water.

PRIOR ART DOCUMENTS

Patent Documents

Patent Document 1: Japanese Patent Laid-Open Publication No. 2008-146913

SUMMARY OF THE INVENTION

The present invention has been accomplished in view of the circumstances, and has an object to provide a polymer compound for a conductive polymer having a specific super strongly acidic sulfo group, which is soluble in an organic solvent, and suitably used for a fuel cell or a dopant for a conductive material. In addition, the present invention also has an object to provide a method for manufacturing such a polymer compound for a conductive polymer.

To solve the problems, the present invention provides a polymer compound for a conductive polymer which comprises one or more repeating units represented by the following general formula (1), which has been synthesized by ion-exchange of a lithium salt, a sodium salt, a potassium salt, or a nitrogen compound salt of a sulfonic acid residue, and has a weight average molecular weight in the range of 1,000 to 500,000,

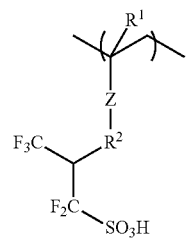

(1)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and ester group, and Z represents a phenylene group, a naphthylene group, or an ester group.

Such a polymer compound for a conductive polymer can be a polymer compound for a conductive polymer having a specific super strongly acidic sulfo group, which is soluble in an organic solvent, and suitably used for a fuel cell or a dopant for a conductive material.

At this time, the repeating unit represented by the general formula (1) is preferably selected from repeating units represented by the following general formulae (2-1) to (2-4),

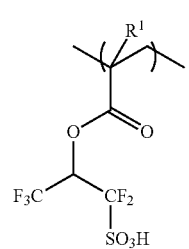

(2-1)

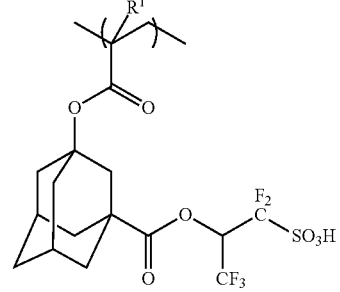

(2-2)

-continued

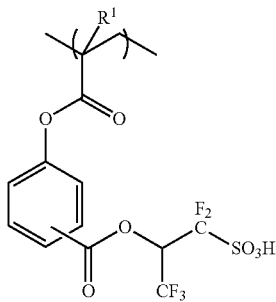
(2-3)

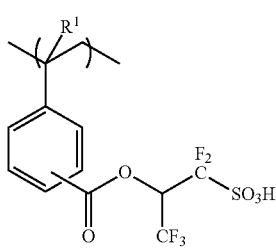
(2-4)

wherein $R^1$ has the same meaning as defined above.

If such a repeating unit is comprised, the polymer compound becomes a more suitable material for a fuel cell or a dopant for a conductive material.

At this time, the lithium salt, the sodium salt, the potassium salt, or the nitrogen compound salt of the sulfonic acid residue preferably comprises a repeating unit represented by the following general formula (3),

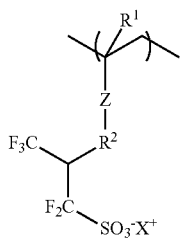
(3)

wherein $R^1$, $R^2$ and Z have the same meanings as defined above, and X represents lithium, sodium, potassium or a nitrogen compound represented by the following general formula (4),

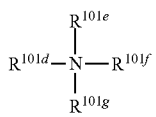
(4)

wherein $R^{101d}$, $R^{101e}$, $R^{101f}$, and $R^{101g}$ each represent a hydrogen atom, or a linear, branched, or cyclic alkyl group, alkenyl group, oxoalkyl group, or oxoalkenyl group each having 1 to 12 carbon atoms, an aryl group having 6 to 20 carbon atoms, or an aralkyl group or an aryloxoalkyl group each having 7 to 12 carbon atoms, and a part or whole of the hydrogen atom(s) of these groups may be substituted by an alkoxy group; $R^{101d}$ and $R^{101e}$, or $R^{101d}$, $R^{101e}$, and $R^{101f}$ may form a ring together, and when a ring is formed, $R^{101d}$ and $R^{101e}$, or $R^{101d}$, $R^{101e}$, and $R^{101f}$ represent an alkylene group having 3 to 10 carbon atoms or a heteroaromatic ring having the nitrogen atom in the formula in the ring.

Such a repeating unit is easily converted into the repeating unit represented by the general formula (1) by ion-exchange.

Further, the present invention provides a method for manufacturing the polymer compound for a conductive polymer comprising a repeating unit represented by the following general formula (1), which comprises, subjecting to polymerization reaction using a monomer which has a structure of a salt comprising a sulfonic acid residue and lithium, sodium, potassium, or a nitrogen compound, and after polymerization, converting the structure of the salt comprising the sulfonic acid residue and the lithium, the sodium, the potassium, or the nitrogen compound into a sulfo group by ion-exchange,

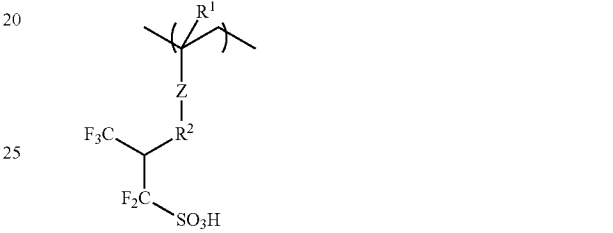
(1)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and an ester group, and Z represents a phenylene group, a naphthylene group, or an ester group.

If such a method for manufacturing is employed, the polymer compound for a conductive polymer comprising the repeating unit represented by the general formula (1) can be manufactured easily.

As mentioned above, the polymer compound for a conductive polymer of the present invention can be a polymer compound for a conductive polymer having a specific super strongly acidic sulfo group, which is soluble in an organic solvent, and suitably used for a fuel cell or a dopant for a conductive material.

By using the polymer compound for a conductive polymer for a fuel cell, a material for a fuel cell having high dielectric constant can be formed. Also, by using it as a dopant for a conjugated double bond polymer, a conductive film having high transparency, high conductivity, and high durability can be formed. Moreover, it is excellent in solubility in an organic solvent, so that deterioration of an organic EL device can be prevented by using it as a conductive film for an organic EL lighting.

Further, according to the method for manufacturing of the present invention, such a polymer compound for a conductive polymer of the present invention can be manufactured easily.

DETAILED DESCRIPTION OF THE PREFERRED EMBODIMENTS

As mentioned above, it has been desired to develop a polymer compound for a conductive polymer having a specific super strongly acidic sulfo group, which is soluble in an organic solvent, and suitably used for a fuel cell or a dopant for a conductive material.

For the purpose of preventing the deterioration of the organic EL device, by changing a water-soluble conductive polymer containing water which causes the deterioration into an organic solvent-soluble polymer containing an extremely little water content; the present inventors have tried to develop a polymer for a dopant having high solubility in an organic solvent from polystyrene sulfonic acid which is a dopant soluble in water but difficultly soluble in an organic solvent. They have investigated to introduce a fluorine since it is effective for increasing solubility in an organic solvent to introduce a long-chain alkyl group or a fluorine, and found out that the problems can be solved by using a polymer compound comprising a repeating unit particularly having a sulfo group an α-position of which has been fluorinated, whereby accomplished the present invention.

The present invention provides a polymer compound for a conductive polymer which comprises one or more repeating units represented by the following general formula (1), which has been synthesized by ion-exchange of a lithium salt, a sodium salt, a potassium salt, or a nitrogen compound salt of a sulfonic acid residue, and has a weight average molecular weight in the range of 1,000 to 500,000,

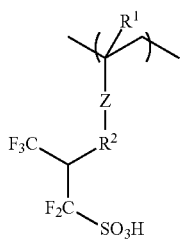

(1)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and an ester group, and Z represents a phenylene group, a naphthylene group, or an ester group.

In the following, the present invention is explained in detail, but the present invention is not limited by these.

The polymer compound for a conductive polymer of the present invention is a polymer comprising one or more repeating units represented by the general formula (1). When the polymer is a homopolymer comprising the repeating unit represented by the general formula (1) alone, the polymer has particularly high transparency.

In the general formula (1), $R^1$ represents a hydrogen atom or a methyl group.

$R^2$ represents a single bond, an ester group, or a linear, branched, or cyclic hydrocarbon group having 1 to 12 carbon atoms which may have either or both of an ether group and an ester group; and the hydrocarbon group may be mentioned, for example, an alkylene group, an arylene group, an alkenylene group, etc.

Z represents a phenylene group, a naphthylene group, or an ester group.

At this time, the repeating unit represented by the general formula (1) is preferably selected from repeating units represented by the following general formulae (2-1) to (2-4),

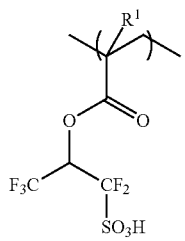

(2-1)

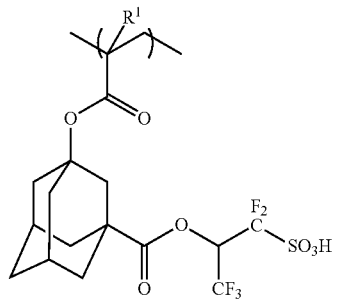

(2-2)

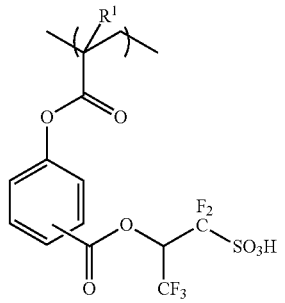

(2-3)

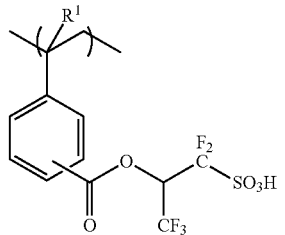

(2-4)

wherein $R^1$ has the same meaning as defined above.

If such a repeating unit is comprised, the polymer compound becomes a more suitable material for a fuel cell or a dopant for a conductive material.

Also, the polymer compound for a conductive polymer of the present invention is synthesized by ion-exchange of a lithium salt, a sodium salt, a potassium salt, or a nitrogen compound salt of a sulfonic acid residue.

The lithium salt, the sodium salt, the potassium salt, or the nitrogen compound salt of the sulfonic acid residue preferably comprises a repeating unit represented by the following general formula (3),

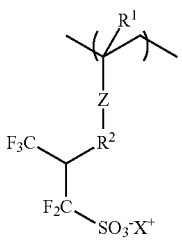

(3)

wherein $R^1$, $R^2$, and Z have the same meanings as defined above, and X represents lithium, sodium, potassium, or a nitrogen compound represented by the following general formula (4),

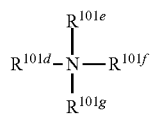

(4)

wherein $R^{101d}$, $R^{101e}$, $R^{101f}$, $R^{101g}$ each represent a hydrogen atom, or a linear, branched, or cyclic alkyl group, alkenyl group, oxoalkyl group, or oxoalkenyl group each having 1 to 12 carbon atoms, an aryl group having 6 to 20 carbon atoms, or an aralkyl group or an aryloxoalkyl group each having 7 to 12 carbon atoms, and a part or whole of the hydrogen atom(s) of these groups may be substituted by an alkoxy group, etc.; $R^{101d}$ and $R^{101e}$ or $R^{101d}$, $R^{101e}$, and $R^{101f}$ may form a ring together, and when a ring is formed, $R^{101d}$ and $R^{101e}$, or $R^{101}$, $R^{101e}$, and $R^{101f}$ represent an alkylene group having 3 to 10 carbon atoms or a heteroaromatic ring having the nitrogen atom in the formula in the ring.

Such a repeating unit is preferred since it is easily converted into the repeating unit represented by the general formula (1) by ion-exchange.

Also, the polymer compound for a conductive polymer of the present invention has a weight average molecular weight in the range of 1,000 to 500,000, preferably in the range of 2,000 to 200,000. If the weight average molecular weight is less than 1,000, the polymer compound is inferior in heat resistance. On the other hand, if the weight average molecular weight exceeds 500,000, viscosity of the polymer compound is increased, workability is worsened, and solubility in an organic solvent or water is lowered.

The weight average molecular weight (Mw) is a measured value in terms of polystyrene by gel permeation chromatography (GPC) using water, dimethyl formamide (DMF), tetrahydrofuran (THF) as a solvent.

The polymer compound for a conductive polymer of the present invention as mentioned above can be a polymer compound for a conductive polymer having a specific super strongly acidic sulfo group, which is soluble in an organic solvent, and suitably used for a fuel cell or a dopant for a conductive material.

In addition, the present invention provides a method for manufacturing such a polymer compound for a conductive polymer of the present invention.

The method for manufacturing of the present invention is a method for manufacturing a polymer compound for a conductive polymer comprising a repeating unit represented by the following general formula (1), which comprises subjecting to polymerization reaction using a monomer which has a structure of a salt comprising a sulfonic acid residue and lithium, sodium, potassium, or a nitrogen compound, and after polymerization, converting the structure of the salt comprising the sulfonic acid residue and the lithium, the sodium, the potassium, or the nitrogen compound into a sulfo group by ion-exchange,

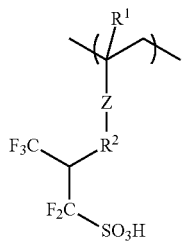

(1)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and ester group, and Z represents a phenylene group, a naphthylene group, or an ester group.

The monomer having a structure of a salt comprising a sulfonic acid residue and lithium, sodium, potassium, or a nitrogen compound to be used in the method for manufacturing of the present invention may be specifically exemplified by the following.

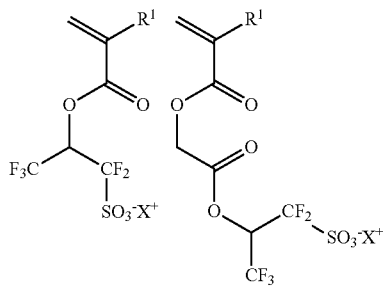

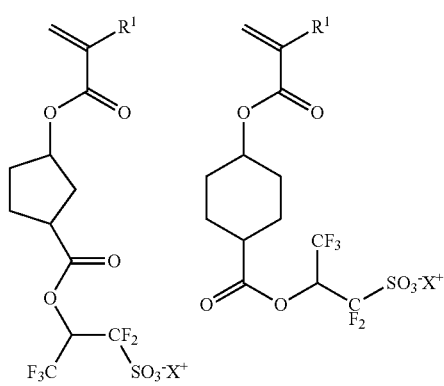

-continued
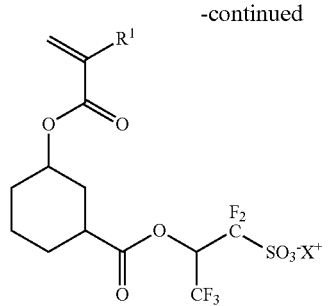
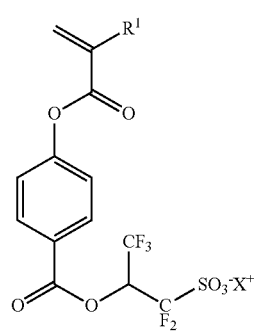
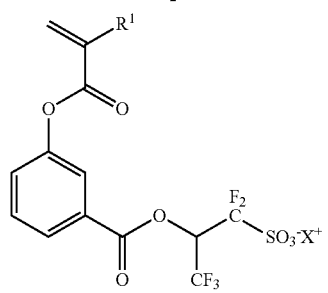
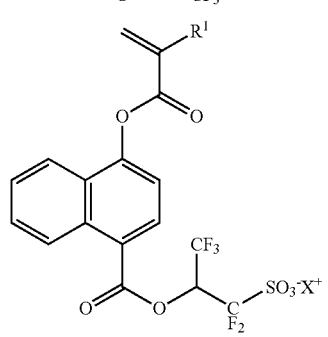
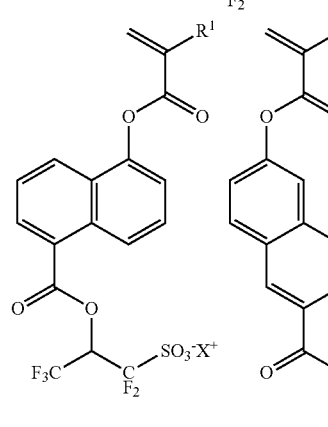
-continued
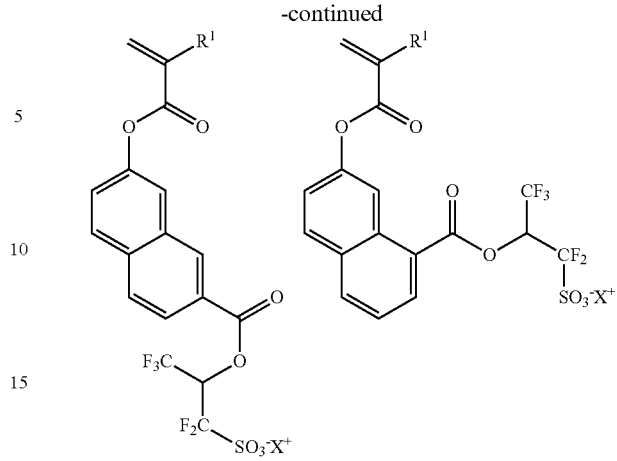
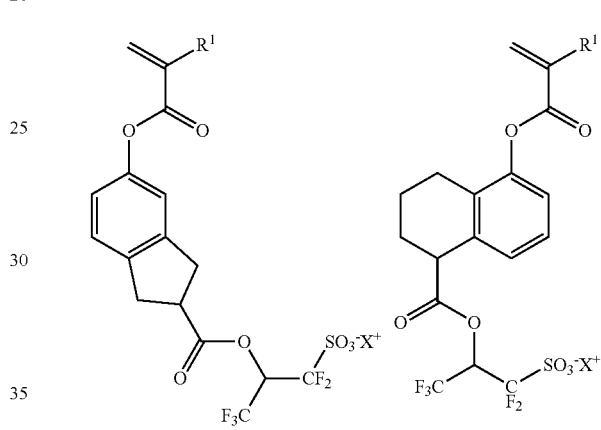
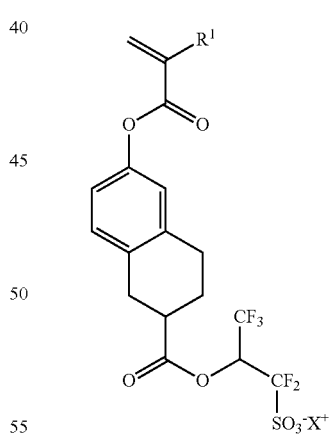
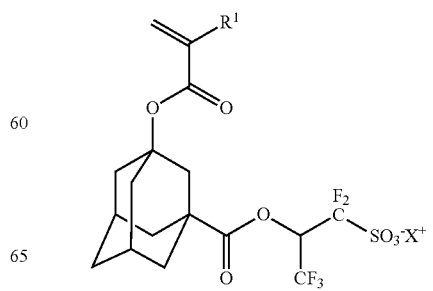

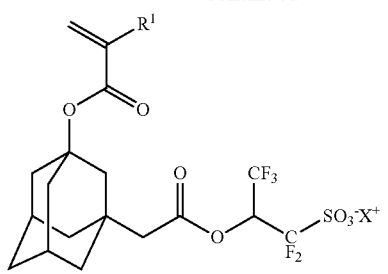
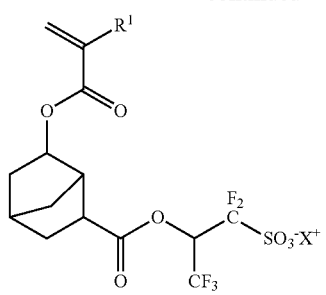
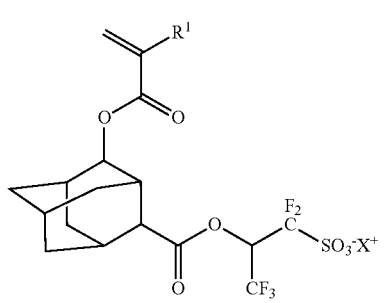
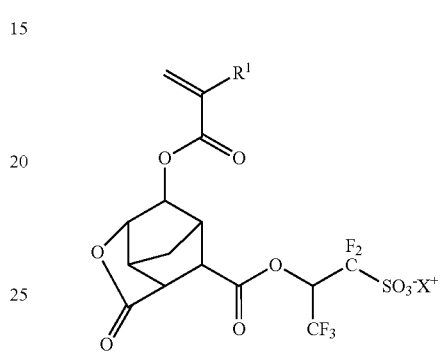
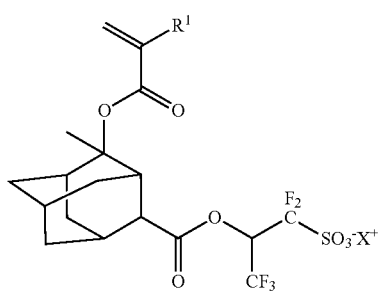
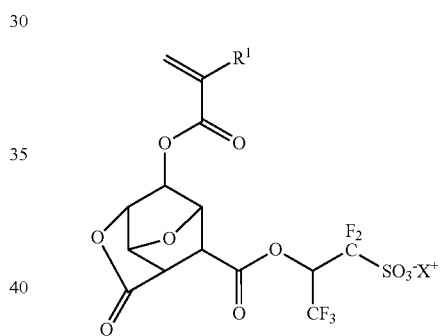
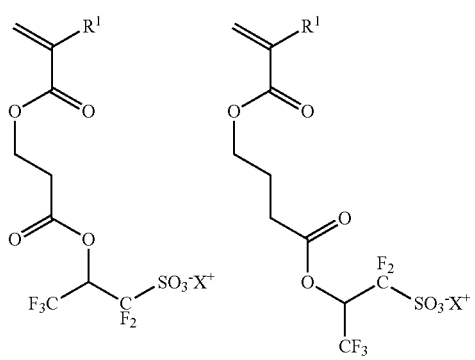
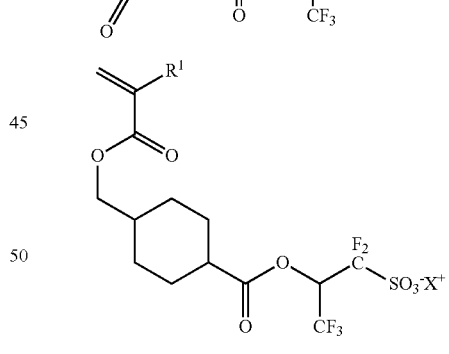
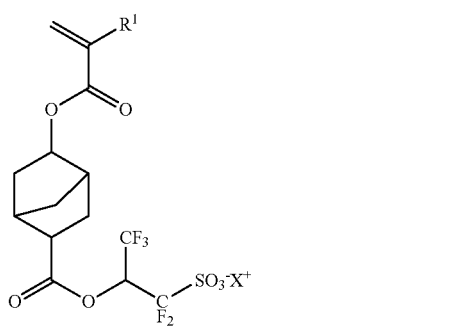
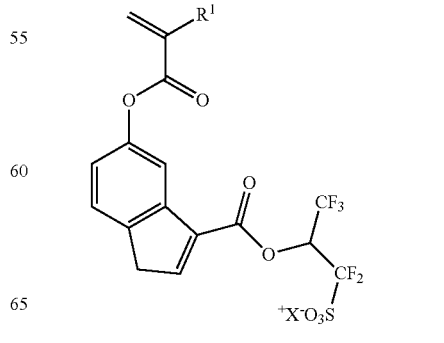

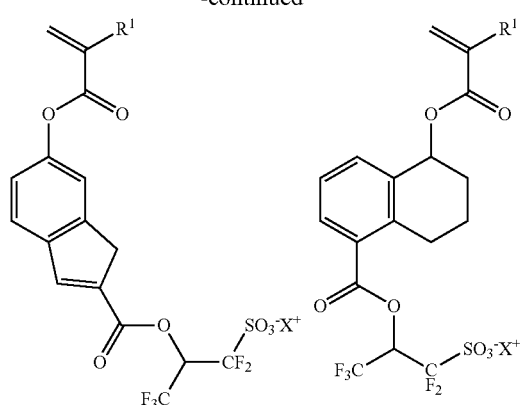
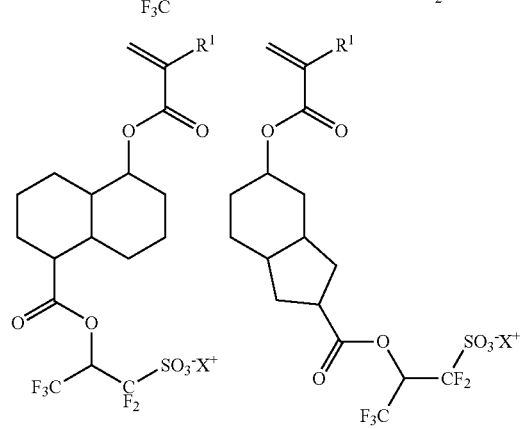
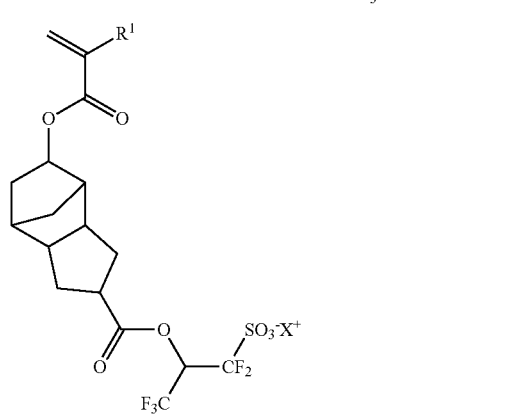
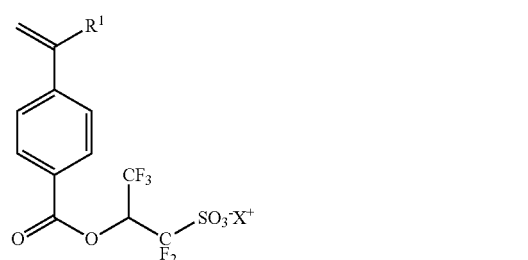
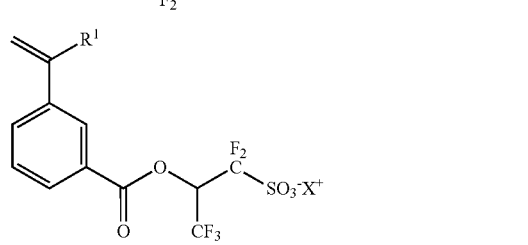
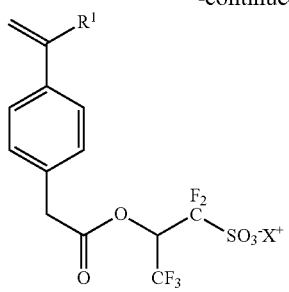
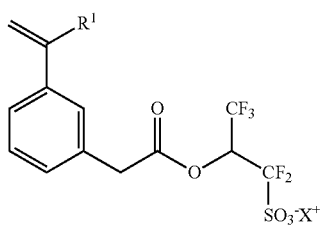
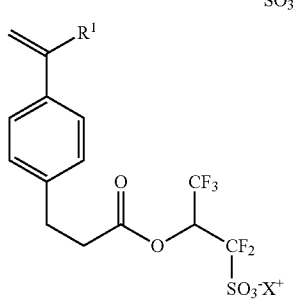
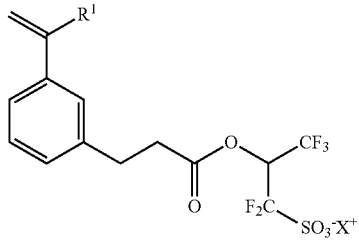
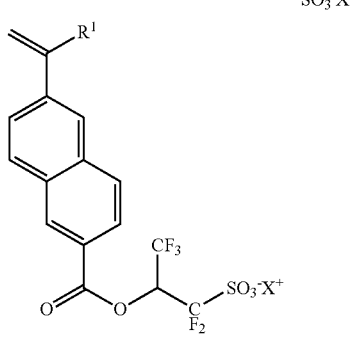
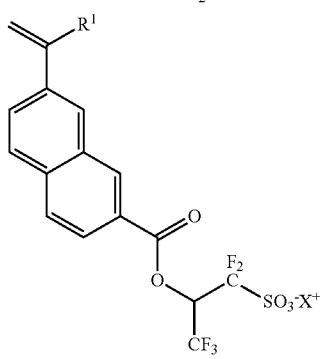

-continued

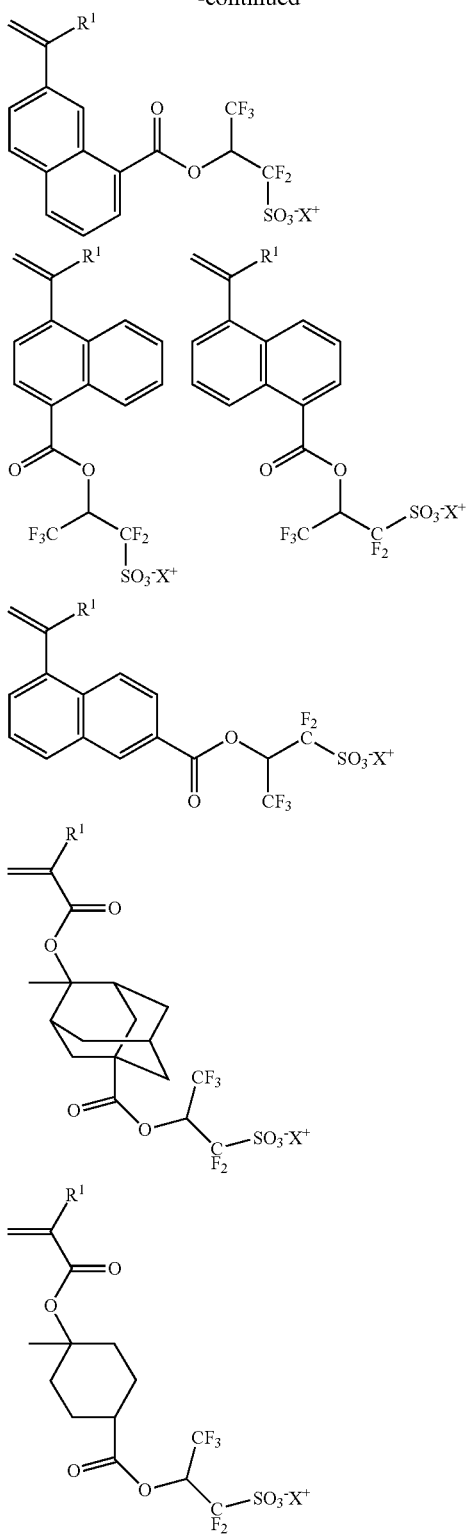

wherein R¹ has the same meaning as defined above, and X represents lithium, sodium, potassium, or a nitrogen compound.

When X represents a nitrogen compound, the nitrogen compound represented by the general formula (4) is preferable.

As a method for synthesizing the polymer compound for a conductive polymer of the present invention, for example, a desired monomer(s) among the above monomers is/are subjected to heat polymerization by adding a radical polymerization initiator in an organic solvent to obtain a polymer compound of a copolymer.

As the organic solvent to be used for the polymerization, there may be exemplified by toluene, benzene, tetrahydrofuran, diethyl ether, dioxane, cyclohexane, cyclopentane, methyl ethyl ketone, γ-butyrolactone, etc.

As the radical polymerization initiator, there may be exemplified by 2,2'-azobisisobutyronitrile (AIBN), 2,2'-azobis(2,4-dimethyl valeronitrile), dimethyl 2,2-azobis(2-methyl propionate), benzoyl peroxide, lauroyl peroxide, etc.

The reaction temperature is preferably 50 to 80° C., and the reaction time is preferably 2 to 100 hours, more preferably 5 to 20 hours.

In the polymer compound for a conductive polymer of the present invention, the monomer(s) which becomes the repeating unit(s) represented by the general formula (1) may be one kind or a combination of two or more kinds, and it is preferred to combine methacryl type and styrene type monomers to heighten polymerizability. In addition, two or more kinds of the monomers constituting the repeating units may be each block copolymerized. When a block copolymerized polymer (block copolymer) is used as a conductive film, it can be expected to obtain a merit that the conductivity is improved by aggregating the repeating unit portions comprising the two or more kinds of the repeating units with each other to form a sea-island structure.

When a random copolymerization is to be carried out by a radical polymerization, it is general to use the method in which the monomer(s) and a radical polymerization initiator are mixed and polymerized by heating. In the case that the polymerization is started with a first monomer in the presence of a radical polymerization initiator, and then adding a second monomer thereto later, the resulting polymer has a structure in which one side of the polymer molecule is a structure that the first monomer is polymerized, and the other side is a structure that the second monomer is polymerized. However, in this case, the repeating units of the first and the second monomer are mixedly present at the middle portion, which is different in the structure from the block copolymer. For forming the block copolymer by radical polymerization, the living radical polymerization is preferably used.

In a living radical polymerization method called RAFT polymerization (Reversible Addition Fragmentation chain Transfer polymerization), the radical at the polymer terminal is always living, so that it is possible to form a block copolymer comprising the first and the second repeating units by starting the polymerization with the first monomer, and then adding the second monomer at the time when the first monomer has been consumed. In addition, it is also possible to form a triblock copolymer by starting the polymerization with the first monomer, then adding the second monomer at the time when the first monomer has been consumed, and then adding the third monomer thereto.

When the RAFT polymerization is carried out, there is a characteristic that a narrowly distributed polymer having a narrow molecular weight distribution (degree of distribution) is formed, in particular, when the RAFT polymerization is carried out by adding the monomers at once, a polymer having a narrower molecular weight distribution can be formed.

The polymer compound for a conductive polymer of the present invention preferably has a narrow distribution, and the molecular weight distribution (Mw/Mn) thereof is preferably 1.0 to 2.0, particularly preferably 1.0 to 1.5. If the polymer compound has a narrow distribution, it is possible to prevent unevenness of the conductivity in the conductive polymer synthesized by using the polymer compound.

To carry out the RAFT polymerization, a chain transfer agent is necessary, and specific examples thereof may be mentioned 2-cyano-2-propyl benzothioate, 4-cyano-4-(phenylcarbonothioylthio)pentanoic acid, 2-cyano-2-propyl dodecyl trithiocarbonate, 4-cyano-4-[(dodecylsulfanylthiocarbonyl)sulfanyl]pentanoic acid, 2-(dodecylthiocarbonothioylthio)-2-methylpropanoic acid, cyanomethyl dodecyl thiocarbonate, cyanomethyl methyl(phenyl)carbamothioate, bis(thiobenzoyl)disulfide, and bis(dodecylsulfanylthiocarbonyl)disulfide. Among these, 2-cyano-2-propyl benzothioate is particularly preferred.

In the method for manufacturing the polymer compound for a conductive polymer of the present invention, after polymerizing the monomer as mentioned above, the structure of the salt comprising the sulfonic acid residue and the lithium, the sodium, the potassium, or the nitrogen compound is converted into a sulfo group by ion-exchange.

At this time, ion-exchanging may be carried out by using, for example, an ion exchange resin.

The polymer compound for a conductive polymer comprising the repeating unit represented by the general formula (1) can be easily manufactured by the method as mentioned above.

As mentioned above, the polymer compound for a conductive polymer of the present invention can be a polymer compound for a conductive polymer having a specific super strongly acidic sulfo group, which is soluble in an organic solvent, and suitably used for a fuel cell or a dopant for a conductive material.

By using the polymer compound for a conductive polymer for a fuel cell, a material for a fuel cell having high dielectric constant can be formed. Also, by using it as a dopant for a conjugated double bond polymer, a conductive film having high transparency, high conductivity and high durability can be formed. Moreover, it is excellent in solubility in an organic solvent, so that deterioration of an organic EL device can be prevented by using it as a conductive film for an organic EL lighting.

Further, according to the method for manufacturing of the present invention, such a polymer compound for a conductive polymer of the present invention can be manufactured easily.

EXAMPLES

In the following, the present invention is explained specifically by referring to Examples, but the present invention is not limited by these.

In the following, monomers used in syntheses of Examples are shown.

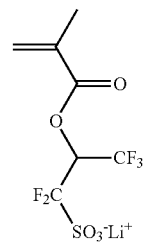

Monomer 1

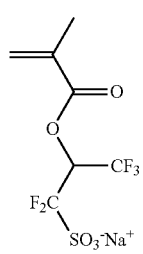

Monomer 2

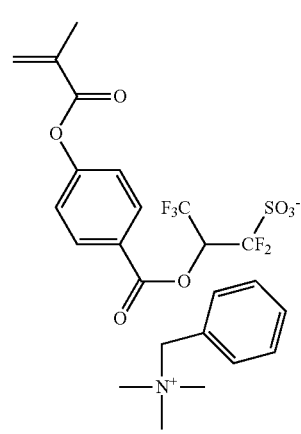

Monomer 3

Monomer 4

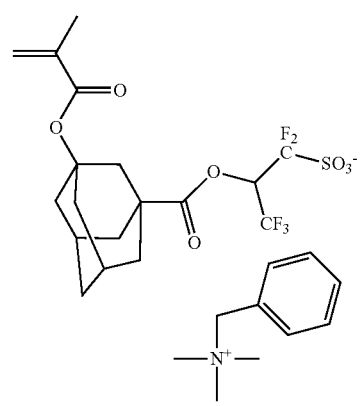

Monomer 5

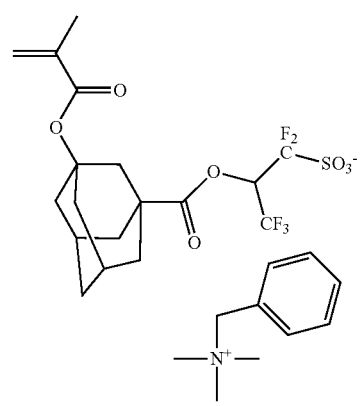

Monomer 6
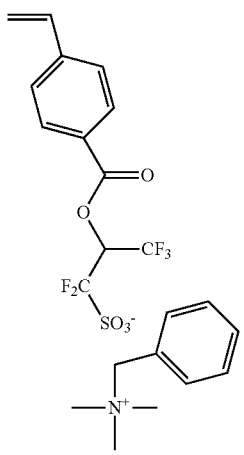
Monomer 7
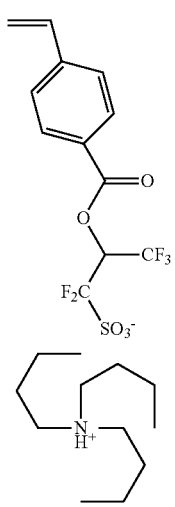
Monomer 8
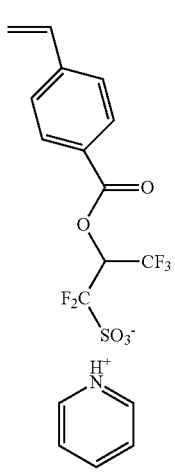
Monomer 9
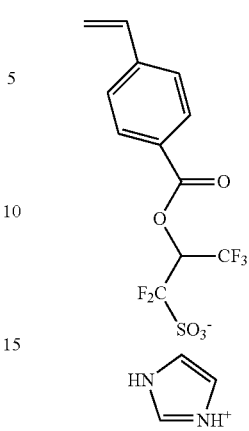
Monomer 10
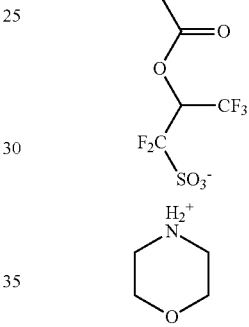
Monomer 11
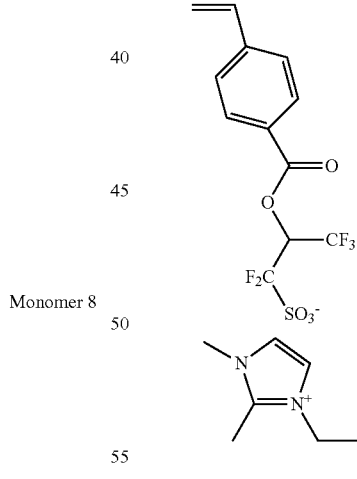
Monomer 12
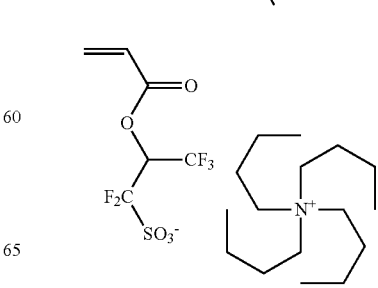

-continued

Monomer 13

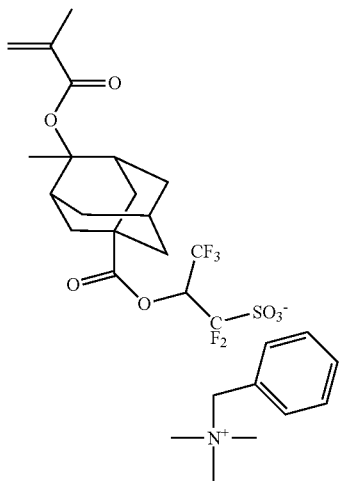

Monomer 14

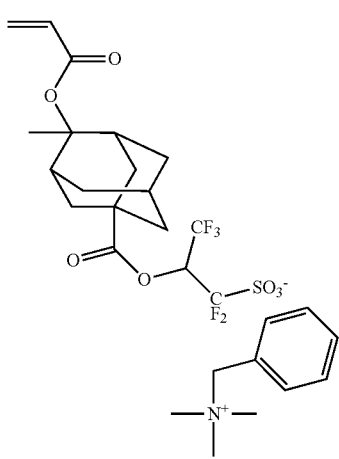

Monomer 15

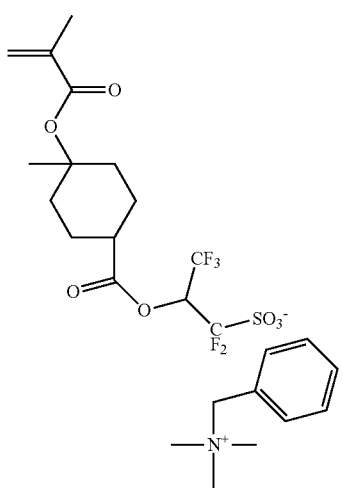

Monomer 1: sodium 1,1,3,3,3-pentafluoro-2-(methacryloyloxy)propane-1-sulfonate

Monomer 2: lithium 1,1,3,3,3-pentafluoro-2-(methacryloyloxy)propane-1-sulfonate

Monomer 3: benzyltrimethylammonium 1,1,3,3,3-pentafluoro-2-(methacryloyloxy)propane-1-sulfonate Monomer 4: benzyltrimethylammonium 1,1,3,3,3-pentafluoro-2-(3-methacryloyloxy-adamantane-1-carbonyloxy)-propane-1-sulfonate Monomer 5: benzyltrimethylammonium 1,1,3,3,3-pentafluoro-2-(3-methacryloyloxy-benzene-4-carbonyloxy)-propane-1-sulfonate Monomer 6: benzyltrimethylammonium 2-(4-vinylbenzoyloxy)-1,1,3,3,3-pentafluoropropane-1-sulfonate Monomer 7: tributylammonium 2-(4-vinylbenzoyloxy)-1,1,3,3,3-pentafluoropropane-1-sulfonate Monomer 8: pyridinium 2-(4-vinylbenzoyloxy)-1,1,3,3,3-pentafluoropropane-1-sulfonate Monomer 9: imidazolinium 2-(4-vinylbenzoyloxy)-1,1,3,3-pentafluoropropane-1-sulfonate Monomer 10: morpholinium 2-(4-vinylbenzoyloxy)-1,1,3,3,3-pentafluoropropane-1-sulfonate Monomer 11: 1,2-Dimethyl-3-propyl imidazolium 2-(4-vinylbenzoyloxy)-1,1,3,3,3-pentafluoropropane-1-sulfonate Monomer 12: tetrabutylammonium 1,1,3,3,3-pentafluoro-2-(acryloyloxy)propane-1-sulfonate Monomer 13: benzyltrimethylammonium 1,1,3,3,3-pentafluoro-2-(4-methacryloyloxy-4-methyladamantane-1-carbonyloxy)-propane-1-sulfonate Monomer 14: benzyltrimethylammonium 1,1,3,3,3-pentafluoro-2-(4-acryloyloxy-4-methyladamantane-1-carbonyloxy)-propane-1-sulfonate Monomer 15: benzyltrimethylammonium 1,1,3,3,3-pentafluoro-2-(4-acryloyloxy-4-methylcyclohexane-1-carbonyloxy)-propane-1-sulfonate Example 1

Under nitrogen atmosphere, to 37.5 g of methanol stirred at 64° C. was added dropwise a solution in which 22.8 g of Monomer 1 and 5.13 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 18.2 g of a white polymer.

The obtained white polymer was dissolved in 912 g of pure water, and the sodium salt was converted into a sulfo group by using an ion exchange resin. When the obtained polymer was measured by $^{19}$F-NMR, $^{1}$H-NMR, and GPC, the following analytical results could be obtained.

Weight average molecular weight (Mw)=43,000
Molecular weight distribution (Mw/Mn)=1.93
This polymer compound is made Polymer 1.

Polymer 1

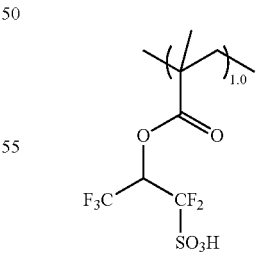

Example 2

Under nitrogen atmosphere, to 37.5 g of methanol stirred at 64° C. was added dropwise a solution in which 22.0 g of Monomer 2 and 5.13 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 19.3 g of a white polymer.

The obtained white polymer was dissolved in 912 g of pure water, and the lithium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=61,000
Molecular weight distribution (Mw/Mn)=1.79
This polymer compound is made Polymer 2.

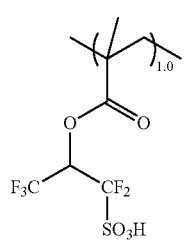

Polymer 2

Example 3

Under nitrogen atmosphere, to 37.5 g of methanol stirred at 64° C. was added dropwise a solution in which 44.7 g of Monomer 3 and 5.13 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 35.8 g of a white polymer.

The obtained white polymer was dissolved in 912 g of pure water, and the benzyltrimethylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=41,000
Molecular weight distribution (Mw/Mn)=1.88
This polymer compound is made Polymer 3.

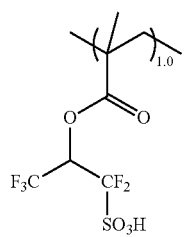

Polymer 3

Example 4

Under nitrogen atmosphere, to 37.5 g of methanol stirred at 64° C. was added dropwise a solution in which 62.5 g of Monomer 4 and 2.82 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 50.3 g of a white polymer.

The obtained white polymer was dissolved in 421 g of methanol, and the benzyltrimethylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=43,000
Molecular weight distribution (Mw/Mn)=1.77
This polymer compound is made Polymer 4.

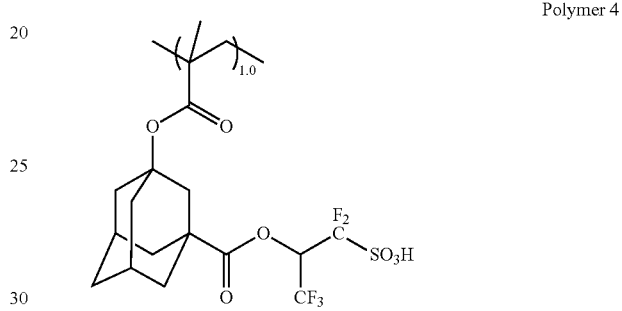

Polymer 4

Example 5

Under nitrogen atmosphere, to 37.5 g of methanol stirred at 64° C. was added dropwise a solution in which 56.7 g of Monomer 5 and 3.04 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 46.5 g of a white polymer.

The obtained white polymer was dissolved in 424 g of methanol, and the benzyltrimethylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=29,000
Molecular weight distribution (Mw/Mn)=1.81
This polymer compound is made Polymer 5.

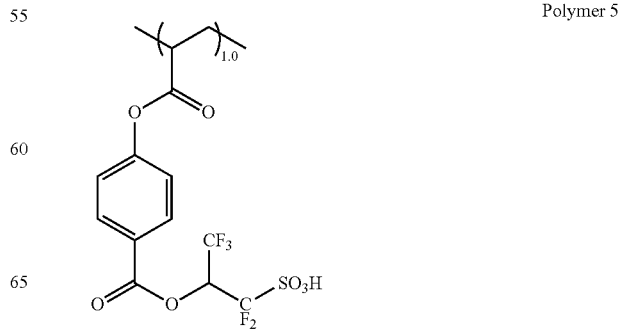

Polymer 5

Example 6

Under nitrogen atmosphere, to 37.5 g of methanol stirred at 64° C. was added dropwise a solution in which 50.9 g of Monomer 6 and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 44.0 g of a white polymer.

The obtained white polymer was dissolved in 396 g of methanol, and the benzyltrimethylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=29,300
Molecular weight distribution (Mw/Mn)=1.96
This polymer compound is made Polymer 6.

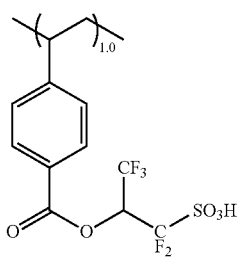

Polymer 6

Example 7

Under nitrogen atmosphere, to 37.5 g of methanol stirred at 64° C. was added dropwise a solution in which 54.5 g of Monomer 7 and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 43.6 g of a white polymer.

The obtained white polymer was dissolved in 396 g of methanol, and the tributylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=24,400
Molecular weight distribution (Mw/Mn)=1.94
This polymer compound is made Polymer 7.

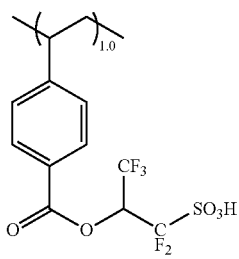

Polymer 7

Example 8

Under nitrogen atmosphere, to 37.5 g of methanol stirred at 64° C. was added dropwise a solution in which 43.9 g of Monomer 8 and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 35.1 g of a white polymer.

The obtained white polymer was dissolved in 396 g of methanol, and the pyridinium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=26,100
Molecular weight distribution (Mw/Mn)=1.91
This polymer compound is made Polymer 8.

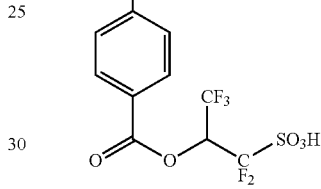

Polymer 8

Example 9

Under nitrogen atmosphere, to 37.5 g of methanol stirred at 64° C. was added dropwise a solution in which 42.8 g of Monomer 9 and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 34.2 g of a white polymer.

The obtained white polymer was dissolved in 396 g of methanol, and the imidazolinium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=21,100
Molecular weight distribution (Mw/Mn)=1.82
This polymer compound is made Polymer 9.

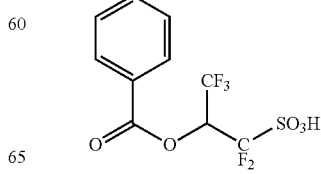

Polymer 9

Example 10

Under nitrogen atmosphere, to 37.5 g of methanol stirred at 64° C. was added dropwise a solution in which 44.7 g of Monomer 10 and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 35.8 g of a white polymer.

The obtained white polymer was dissolved in 396 g of methanol, and the morpholine salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=23,400
Molecular weight distribution (Mw/Mn)=1.79
This polymer compound is made Polymer 10.

Polymer 10

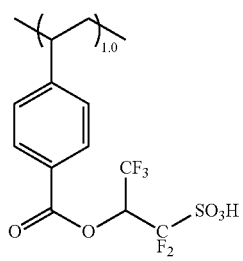

Example 11

Under nitrogen atmosphere, to 37.5 g of methanol stirred at 64° C. was added dropwise a solution in which 49.8 g of Monomer 11 and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 39.8 g of a white polymer.

The obtained white polymer was dissolved in 396 g of methanol, and the 1,2-dimethyl-3-propylimidazolium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=22,100
Molecular weight distribution (Mw/Mn)=1.88
This polymer compound is made Polymer 11.

Polymer 11

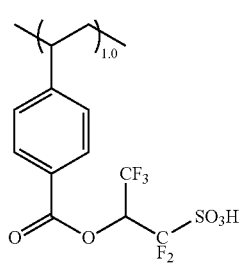

Example 12

Under nitrogen atmosphere, to 37.5 g of methanol stirred at 64° C. was added dropwise a solution in which 22.3 g of Monomer 3, 25.4 g of Monomer 6, and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 38.2 g of a white polymer.

The obtained white polymer was dissolved in 396 g of methanol, and the benzyltrimethylammonium salt was converted into a sulfo group by using an ion exchange resin. When the obtained polymer was measured by $^{19}$F-NMR, $^1$H-NMR, and GPC, the following analytical results could be obtained.

Copolymer composition ratio (Molar ratio)
Monomer 3:Monomer 6=1:1
Weight average molecular weight (Mw)=19,400
Molecular weight distribution (Mw/Mn)=1.69
This polymer compound is made Polymer 12.

Polymer 12

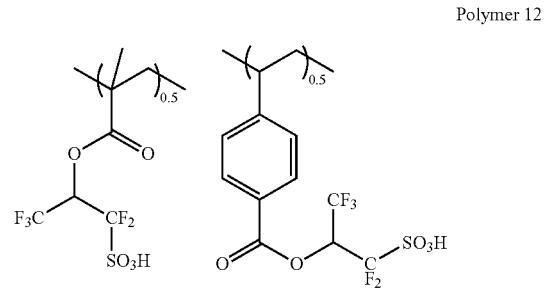

Example 13

Under nitrogen atmosphere, to 37.5 g of methanol stirred at 64° C. was added dropwise a solution in which 54.5 g of Monomer 7 and 2.00 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 44.0 g of a white polymer.

The obtained white polymer was dissolved in 396 g of methanol, and the tributylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=44,400
Molecular weight distribution (Mw/Mn)=2.02

This polymer compound is made Polymer 13.

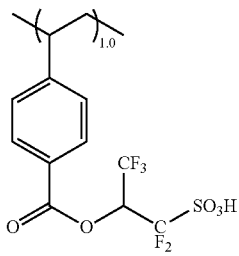

Polymer 13

Example 14

Under nitrogen atmosphere, to 37.5 g of methanol stirred at 64° C. was added dropwise a solution in which 12.6 g of Monomer 4, 35.1 g of Monomer 8, and 4.19 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 38.2 g of a white polymer.

The obtained white polymer was dissolved in 396 g of methanol, and the benzyltrimethylammonium salt and the pyridinium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)
Monomer 4:Monomer 8=1:4
Weight average molecular weight (Mw)=32,400
Molecular weight distribution (Mw/Mn)=1.92
This polymer compound is made Polymer 14.

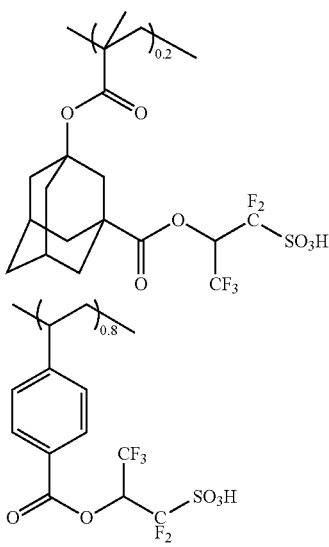

Polymer 14

Example 15

A nallowly distributed polymer was synthesized according to the below mentioned RAFT polymerization.

Under nitrogen atmosphere, in 37.5 g of methanol were dissolved 0.52 g of 2-cyano-2-propyl benzodithioate and 0.13 g of 2,2'-azobisisobutyronitrile, and the solution was stirred at 64° C. for 3 hours under nitrogen atmosphere. To the solution was added dropwise a solution in which 25.4 g of Monomer 6 and 11.0 g of Monomer 2 had been dissolved in 112.5 g of methanol over 4 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 30.9 g of a red polymer.

The obtained red polymer was dissolved in 369 g of methanol, and the benzyltrimethylammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)
Monomer 6:Monomer 2=1:1
Weight average molecular weight (Mw)=23,000
Molecular weight distribution (Mw/Mn)=1.22
This polymer compound is made Polymer 15.

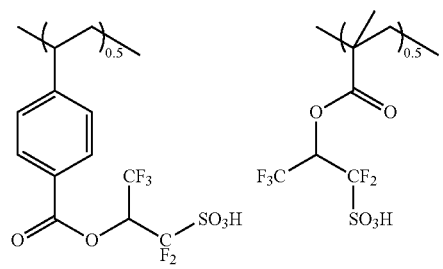

Polymer 15

Example 16

A diblock copolymer was synthesized according to the below mentioned RAFT polymerization.

Under nitrogen atmosphere, in 37.5 g of methanol were dissolved 0.42 g of 2-cyano-2-propyl benzodithioate and 0.10 g of 2,2'-azobisisobutyronitrile, and the solution was stirred at 64° C. for 3 hours under nitrogen atmosphere. To the solution was added dropwise a solution in which 25.4 g of Monomer 6 had been dissolved in 64.3 g of methanol over 2 hours. Subsequently, to the solution was added dropwise a solution in which 11.0 g of Monomer 2 had been dissolved in 48.2 g of methanol over 2 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 29.1 g of a red polymer.

The obtained red polymer was dissolved in 306 g of methanol, and the benzyltrimethylammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)

Monomer 6:Monomer 2=1:1

Weight average molecular weight (Mw)=22,000

Molecular weight distribution (Mw/Mn)=1.31

This polymer compound is made Polymer 16.

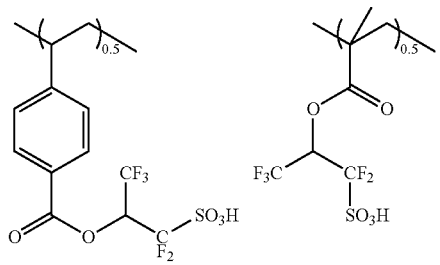

Polymer 16

Example 17

A triblock copolymer was synthesized according to the below mentioned RAFT polymerization.

Under nitrogen atmosphere, in 37.5 g of methanol were dissolved 0.42 g of 2-cyano-2-propyl benzodithioate and 0.10 g of 2,2'-azobisisobutyronitrile, and the solution was stirred at 64° C. for 3 hours under nitrogen atmosphere. To the solution was added dropwise a solution in which 12.7 g of Monomer 6 had been dissolved in 32.2 g of methanol over 2 hours. Subsequently, to the solution was added dropwise a solution in which 11.0 g of Monomer 2 had been dissolved in 48.2 g of methanol over 2 hours. Subsequently, to the solution was added dropwise a solution in which 12.7 g of Monomer 6 had been dissolved in 32.2 g of methanol over 2 hours. After completion of the dropwise addition, the mixture was stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 18.9 g of a red polymer.

The obtained red polymer was dissolved in 306 g of methanol, and the benzyltrimethylammonium salt and the lithium salt were converted into sulfo groups by using an ion exchange resin. When the obtained polymer was measured by $^{19}$F-NMR, $^1$H-NMR, and GPC, the following analytical results could be obtained.

Copolymer composition ratio (Molar ratio)

Monomer 6:Monomer 2=1:1

Weight average molecular weight (Mw)=25,000

Molecular weight distribution (Mw/Mn)=1.36

This polymer compound is made Polymer 17.

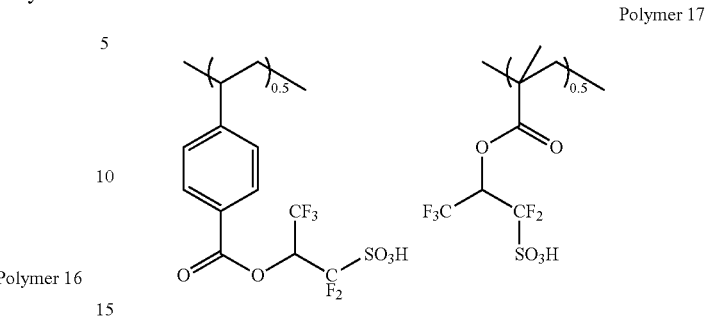

Polymer 17

Example 18

Under nitrogen atmosphere, to 37.5 g of methanol stirred at 64° C. was added dropwise a solution in which 52.5 g of Monomer 12 and 2.82 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 47.3 g of a white polymer.

The obtained white polymer was dissolved in 421 g of methanol, and the tetrabutylammonium salt was converted into a sulfo group by using an ion exchange resin. When the obtained polymer was measured by $^{19}$F-NMR, $^1$H-NMR, and GPC, the following analytical results could be obtained.

Weight average molecular weight (Mw)=38,000

Molecular weight distribution (Mw/Mn)=1.64

This polymer compound is made Polymer 18.

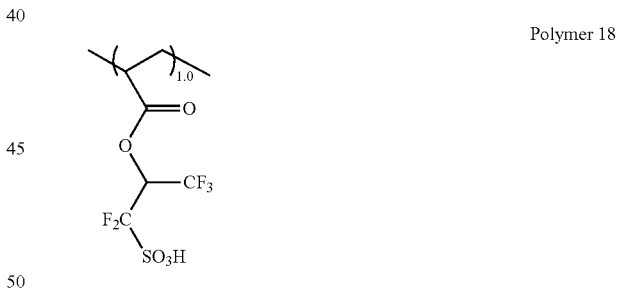

Polymer 18

Example 19

Under nitrogen atmosphere, to 37.5 g of methanol stirred at 64° C. was added dropwise a solution in which 63.9 g of Monomer 13 and 2.82 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 57.5 g of a white polymer.

The obtained white polymer was dissolved in 421 g of methanol, and the benzyltrimethylammonium salt was converted into a sulfo group by using an ion exchange resin.

When the obtained polymer was measured by $^{19}$F-NMR, $^{1}$H-NMR, and GPC, the following analytical results could be obtained.

Weight average molecular weight (Mw)=43,400
Molecular weight distribution (Mw/Mn)=1.98
This polymer compound is made Polymer 19.

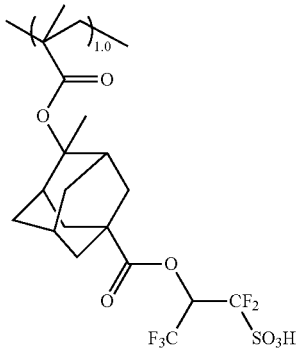

Polymer 19

Example 20

Under nitrogen atmosphere, to 37.5 g of methanol stirred at 64° C. was added dropwise a solution in which 62.5 g of Monomer 14 and 2.82 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 53.5 g of a white polymer.

The obtained white polymer was dissolved in 421 g of methanol, and the benzyltrimethylammonium salt was converted into a sulfo group by using an ion exchange resin. When the obtained polymer was measured by $^{19}$F-NMR, $^{1}$H-NMR, and GPC, the following analytical results could be obtained.

Weight average molecular weight (Mw)=31,400
Molecular weight distribution (Mw/Mn)=1.63
This polymer compound is made Polymer 20.

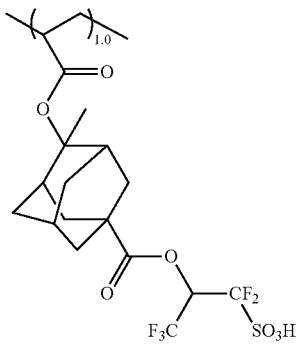

Polymer 20

Example 21

Under nitrogen atmosphere, to 37.5 g of methanol stirred at 64° C. was added dropwise a solution in which 57.5 g of Monomer 15 and 2.82 g of dimethyl 2,2'-azobis(isobutyrate) had been dissolved in 112.5 g of methanol over 4 hours. The mixture was further stirred at 64° C. for 4 hours. After cooling the mixture to room temperature, the mixture was added dropwise to 1,000 g of ethyl acetate under vigorous stirring. The formed solid material was collected by filtration, and vacuum dried at 50° C. for 15 hours to obtain 53.5 g of a white polymer.

The obtained white polymer was dissolved in 421 g of methanol, and the benzyltrimethylammonium salt was converted into a sulfo group by using an ion exchange resin. When the obtained polymer was measured by $^{19}$F-NMR, $^{1}$H-NMR, and GPC, the following analytical results could be obtained.

Weight average molecular weight (Mw)=30,900
Molecular weight distribution (Mw/Mn)=1.84
This polymer compound is made Polymer 21.

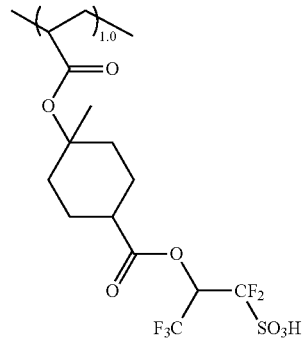

Polymer 21

Polymers 1 to 21 synthesized as mentioned above were soluble in water, methanol, ethanol, isopropyl alcohol, propylene glycol monomethyl ether, tetrahydrofuran, and dimethyl formamide.

Thus, according to the method for manufacturing of the present invention, the polymer compound for a conductive polymer having a specific super strongly acidic sulfo group of the present invention, which is soluble in an organic solvent, can be manufactured.

It must be stated here that the present invention is not restricted to the embodiments shown by the above-mentioned embodiments. The above-mentioned embodiments are merely examples so that any embodiments composed of substantially the same technical concept as disclosed in the claims of the present invention and expressing a similar effect are included in the technical scope of the present invention.

What is claimed is:
1. A method for manufacturing a polymer compound for a conductive polymer comprising a repeating unit represented by the following general formula (1), which comprises
performing a polymerization reaction using a monomer which has a structure of a salt comprising a sulfonic acid residue and lithium, sodium, potassium, or a nitrogen compound, and after polymerization, convert- ing the structure of the salt comprising the sulfonic acid residue and the lithium, the sodium, the potassium, or the nitrogen compound into a sulfo group by ion-exchange using an ion exchange resin, thereby manufacturing a polymer compound which is used for a conductive polymer, wherein the molecular weight distribution (Mw/Mn) of the polymer compound is 1.0 to 2.0, and the polymer compound contains one or more repeating units selected from the repeating units represented by the following general formula (2-2) or (2-3) as the repeating unit represented by the general formula (1),

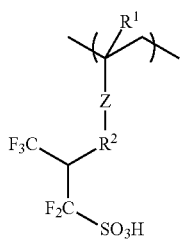
(1)

wherein $R^1$ represents a hydrogen atom or a methyl group, $R^2$ represents a single bond, an ester group, or a linear, branched, or cyclic hydrocarbon group having 1 to 12 carbon atoms which may have either or both of an ether group and an ester group, and Z represents a phenylene group, a naphthylene group, or an ester group, and

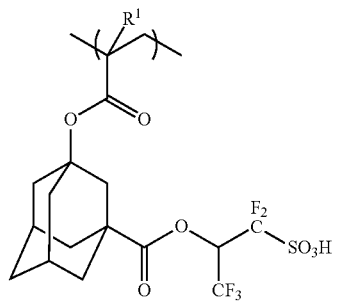
(2-2)

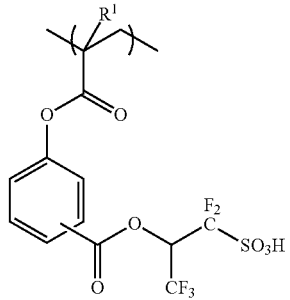
(2-3)

wherein $R^1$ has the same meaning as defined above.

* * * * *